United States Patent
Barbosa et al.

(10) Patent No.: US 10,525,958 B2
(45) Date of Patent: Jan. 7, 2020

(54) ELECTRIC PARKING BRAKE HAVING TWIN INDEPENDENT ACTUATORS

(71) Applicants: Kelsey-Hayes Company, Livonia, MI (US); Lucas Automotive GmbH, Koblenz (DE)

(72) Inventors: Manuel Barbosa, Livonia, MI (US); Antonio Eduardo De Morais, Livonia, MI (US); H. T. Chang, Livonia, MI (US); Christopher McCormick, Livonia, MI (US); Michael Schog, Livonia, MI (US); William Vanderroest, Livonia, MI (US)

(73) Assignees: Kelsey-Hayes Company, Livonia, MI (US); Lucas Automotive GmbH, Koblenz (DE)

( * ) Notice: Subject to any disclaimer, the term of this patent is extended or adjusted under 35 U.S.C. 154(b) by 276 days.

(21) Appl. No.: 15/520,113

(22) PCT Filed: Oct. 21, 2015

(86) PCT No.: PCT/US2015/056624
§ 371 (c)(1),
(2) Date: Apr. 19, 2017

(87) PCT Pub. No.: WO2016/064980
PCT Pub. Date: Apr. 28, 2016

(65) Prior Publication Data
US 2018/0312152 A1    Nov. 1, 2018

Related U.S. Application Data (60) Provisional application No. 62/067,542, filed on Oct. 23, 2014.

(51) Int. Cl.
*B60T 13/74* (2006.01)
*F16D 65/18* (2006.01)
*F16D 121/24* (2012.01)
*F16D 125/40* (2012.01)
*F16D 125/48* (2012.01)
*F16D 55/00* (2006.01)

(52) U.S. Cl.
CPC .......... *B60T 13/741* (2013.01); *F16D 65/18* (2013.01); *F16D 65/183* (2013.01);
(Continued)

(58) Field of Classification Search
CPC ......... F16D 2066/003; F16D 2066/006; F16D 2055/0091; F16D 2125/40; F16D 2125/48;
(Continued)

(56) References Cited

U.S. PATENT DOCUMENTS 5,090,518 A * 2/1992 Schenk .................. B60T 8/00
188/157
6,040,665 A * 3/2000 Shirai ................... B60T 1/065
188/158

(Continued)

OTHER PUBLICATIONS

Chinese First Office Action, Application No. 201580055742.7, dated Aug. 30, 2018.
(Continued)

*Primary Examiner* — Robert A. Siconolfi
*Assistant Examiner* — San M Aung
(74) *Attorney, Agent, or Firm* — MacMillan, Sobanski & Todd, LLC (57) ABSTRACT

An electric parking brake for an automotive vehicle comprises a brake caliper having first and second bores. A first piston is mounted in the first bore and a second piston is mounted in the second bore. A first actuator supports the first piston and a second actuator supports the second piston. The first and second actuators are controlled individually.

20 Claims, 7 Drawing Sheets

(52) U.S. Cl.
CPC .. *F16D 2055/0091* (2013.01); *F16D 2121/24* (2013.01); *F16D 2125/40* (2013.01); *F16D 2125/48* (2013.01)

(58) Field of Classification Search
CPC .... F16D 2121/24; F16D 65/18; F16D 65/183; F16D 65/586; F16D 65/568; F16D 65/847; F16D 65/0978; F16D 65/0979; F16D 55/22; F16D 2065/784; F16D 2055/002; F16D 2125/04; F16D 2125/06; F16D 2200/003; F16D 2200/0013; B60T 13/741; B60T 13/746
USPC ........................................................ 188/72.1
See application file for complete search history.

(56) References Cited

U.S. PATENT DOCUMENTS

| | | | |
|---|---|---|---|
| 2004/0159509 A1 | 8/2004 | Chang et al. | |
| 2004/0231946 A1* | 11/2004 | Neelakantan | F16D 23/12 192/84.6 |
| 2006/0267402 A1* | 11/2006 | Leiter | B60T 7/107 303/20 |
| 2007/0062764 A1* | 3/2007 | Takahashi | B60T 13/746 188/1.11 E |
| 2009/0026024 A1 | 1/2009 | Baldeosingh et al. | |
| 2010/0133051 A1 | 6/2010 | Trimpe et al. | |
| 2013/0341134 A1* | 12/2013 | Chico | F16D 65/28 188/158 |
| 2015/0122593 A1* | 5/2015 | Drennen | F16D 65/18 188/71.5 |
| 2015/0129371 A1* | 5/2015 | Gutelius | F16D 65/18 188/72.6 |

OTHER PUBLICATIONS

PCT International Search Report and the Written Opinion, Application No. PCT/US2015/056624 filed Oct. 21, 2015, dated Jan. 18, 2016.

* cited by examiner

ELECTRIC PARKING BRAKE HAVING TWIN INDEPENDENT ACTUATORS

CROSS REFERENCE TO RELATED APPLICATION

This application claims priority to, and the benefit of, U.S. Provisional Application Ser. No. 62/067,542, filed Oct. 23, 2014, the full disclosure of which is incorporated herein by reference.

BACKGROUND OF INVENTION

This invention relates in general to vehicle disc brake assemblies and in particular to an improved structure for an electric parking brake actuator for use in such a disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefore, are well known in the art.

A typical disc brake assembly includes a brake rotor which is secured to a wheel of the vehicle for rotation therewith. The disc brake assembly further includes a caliper assembly that is slidably supported on pins secured to an anchor bracket. The anchor bracket is secured to a non-rotatable component of the vehicle, such as the axle flange or steering knuckle, which is connected to the vehicle frame. The caliper assembly includes a pair of brake lining assemblies which are disposed on opposite sides of the brake rotor. The brake lining assemblies are connected to one or more hydraulically or pneumatically actuated pistons for movement between a non-braking position and a braking position, wherein they are moved into frictional engagement with the opposed braking surfaces of the brake rotor. For example, when an operator of the vehicle depresses the brake pedal, the piston urges the brake lining assemblies from the non-braking position to the braking position so as to frictionally engage the opposed braking surfaces of the brake rotor and thereby slow or stop rotation of the associated wheel of the vehicle.

The disc brake assembly may also include a single electromechanical actuator that is used to realize a parking brake function of the disc brake assembly. The electromechanical actuator may drive a rotationally restrained nut threaded onto a motor driven spindle. As the spindle is rotationally driven, the nut axially translates to move the piston and urge the brake lining assemblies between the braking and non-braking positions. The piston may be hollow with the nut and spindle located inside the piston.

The disc brake assembly may comprise multiple pistons, each of which has an individual nut and spindle. To realize the parking brake function with multiple pistons, the electromechanical actuator may drive only a single nut and spindle of a single piston. However, when only a single nut and spindle is driven, the single actuator must be large in size to realize the parking brake function. Alternatively, the single actuator, through a gearing, may drive multiple nuts and spindles located in multiple pistons. However, the gearing fixes the displacement of the nuts on the spindles such that the cylinders all displace the same fixed amount. The fixed displacements of the cylinders combine with non-uniform pad wear—e.g., taper wear—of the brake lining assembly to result in the cylinders producing unequal clamping force. Therefore, it would be desirable to have a disc brake assembly having independently controlled actuators for the parking brake function.

SUMMARY OF INVENTION

This invention relates to an electric parking brake for use in a disc brake assembly and a disc brake assembly including such an electric parking brake.

According to one embodiment, an electric parking brake for an automotive vehicle may comprise, individually and/or in combination, one or more of the following features: a brake caliper, first and second pistons, and first and second actuators. The brake caliper has first and second bores. The first piston is mounted in the first bore and the second piston is mounted in the second bore. The first actuator supports the first piston and the second actuator supports the second piston. The first and second actuators are controlled individually.

According to another embodiment, an electric parking brake for an automotive vehicle may comprise, individually and/or in combination, one or more of the following features: a caliper, a brake lining assembly, first and second pistons, and first and second electromechanical actuators. The caliper has first and second bores. The braking lining assembly is mounted to the caliper. The first piston is mounted in the first bore and the second piston is mounted in the second bore. The first and second pistons support the brake lining assembly. The first actuator has a first drive assembly and a first spindle nut. The first drive assembly is operatively connected to a first spindle. The first spindle nut is operatively coupled to the first spindle. Rotation of the first spindle by the first drive assembly axially moves the first spindle nut to support the first piston. The second actuator has a second drive assembly and a second spindle nut. The second drive assembly is operatively connected to a second spindle. The second spindle nut is operatively coupled to the second spindle. Rotation of the second spindle by the second drive assembly axially moves the second spindle nut to support the second piston. The first and second actuators are controlled individually.

According to another embodiment, a method of operating an electric parking brake of an automotive vehicle may comprise, individually and/or in combination, one or more of the following features: Hydraulic fluid is pressurized in first and second bores of a brake caliper until first and second pistons displace towards a brake lining assembly. The first and second pistons are mounted in first and second bores, respectively, of the brake caliper. A first spindle nut is actuated to support the first piston against the brake lining assembly. A second spindle nut is actuated to support the second piston against the brake lining assembly. The first and second spindle nuts are actuated individually.

A potential advantage of an embodiment of the electric parking brake is the actuators each produce the same clamping force independent of non-uniform pad wear—e.g., taper wear. An additional advantage is reduced packaging space for the parking brake.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Referring now to FIGS. 1-6, there is illustrated a first embodiment of an electric parking brake, indicated generally at 100, produced in accordance with the present invention and for use with a disc brake assembly, indicated generally at 102. The general structure and operation of the disc brake assembly 102 is well known in the prior art. Alternatively, the particular electric parking brake 100 of the present invention, and the alternate embodiments thereof, may be used in connection with other types or kinds of disc brake assemblies, if so desired.

Figure 1:
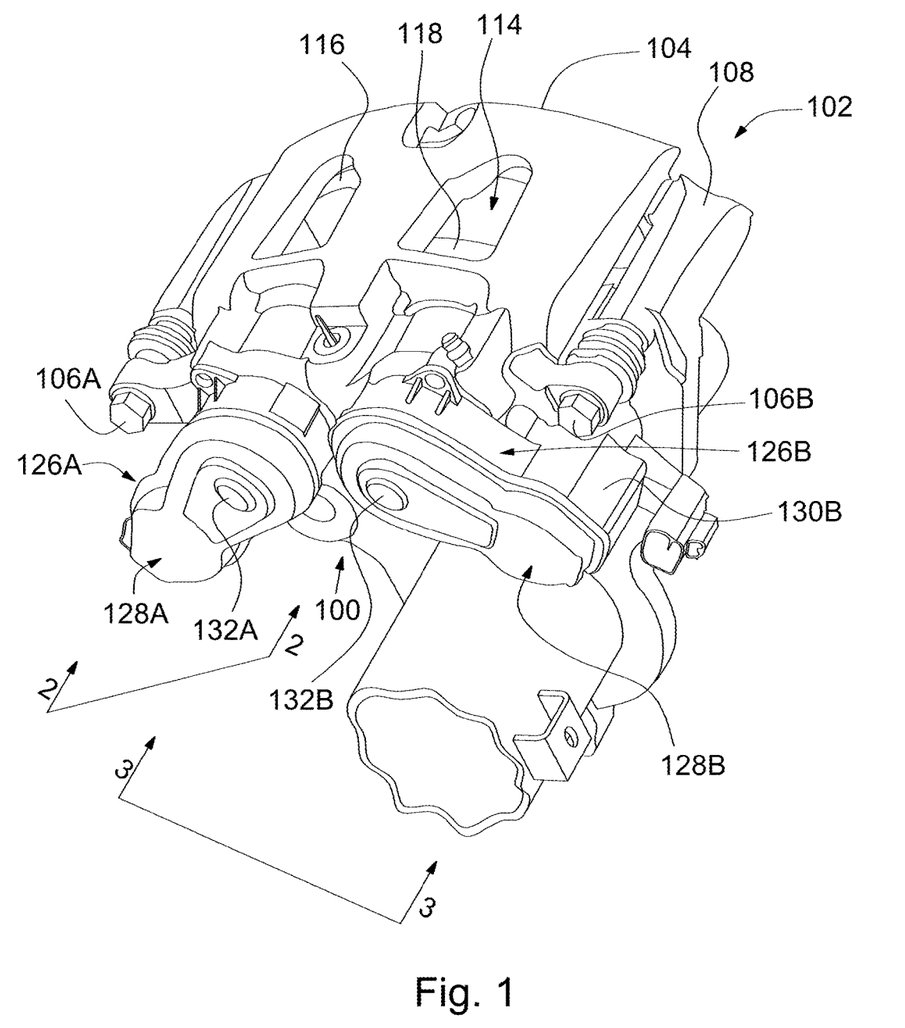
FIG. 1 is a perspective view of a disc brake assembly using a first embodiment of an electric parking brake in accordance with the present invention.
Figure 2:
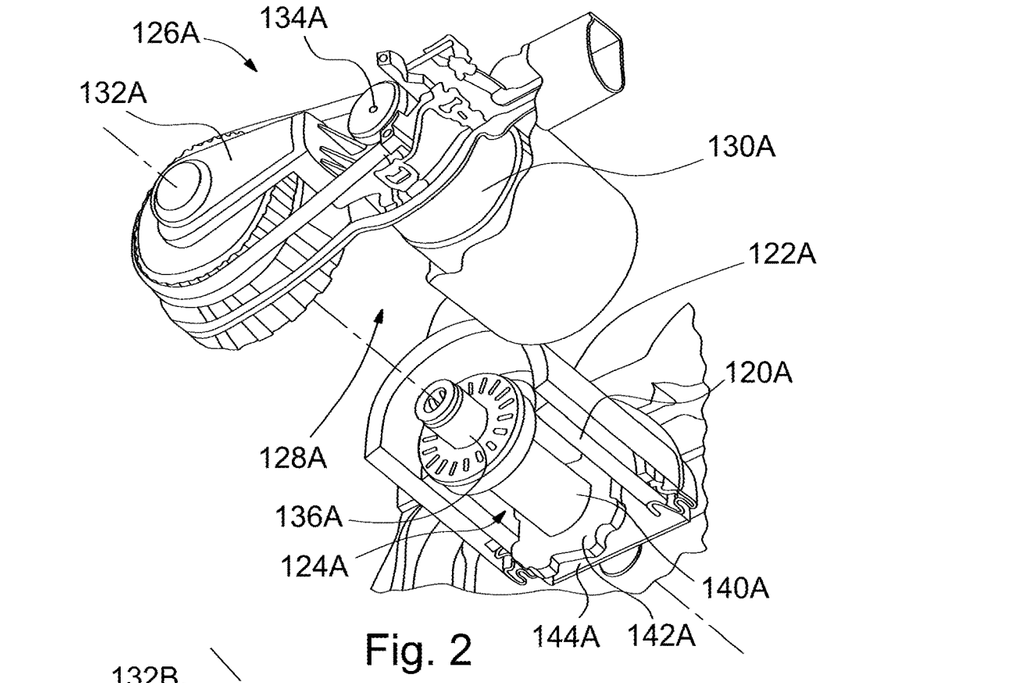
FIG. 2 is a partial sectional view taken along line 2-2 of FIG. 1.
Figure 3:
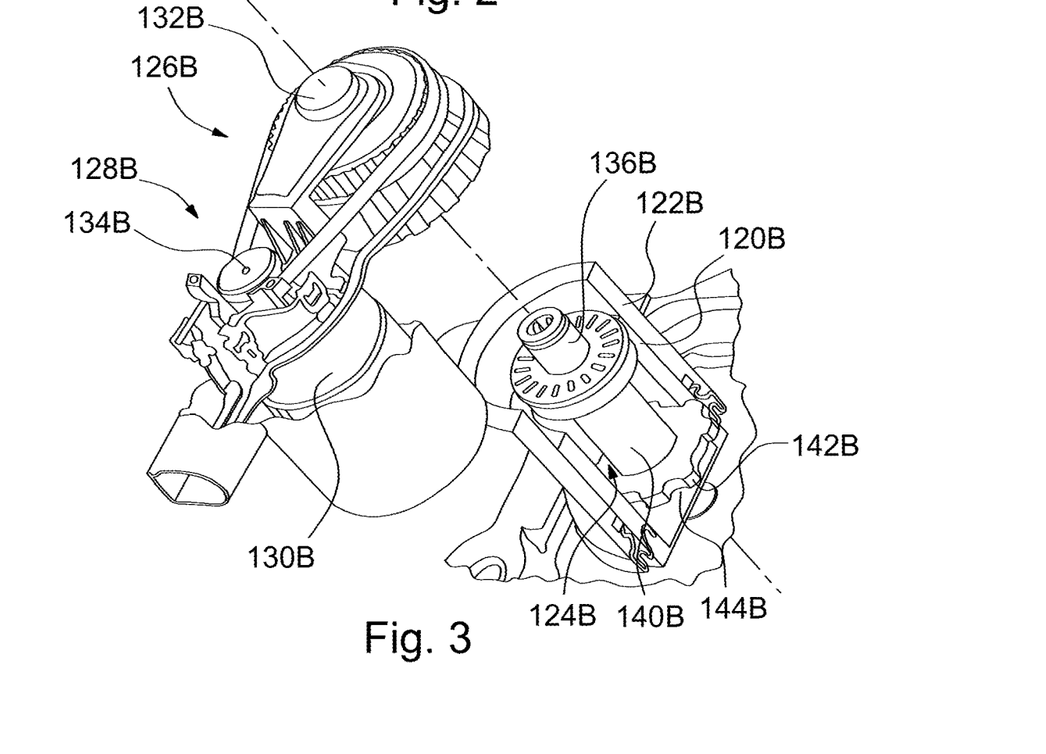
FIG. 3 is a partial sectional view taken along line 3-3 of FIG. 1.
Figure 4:
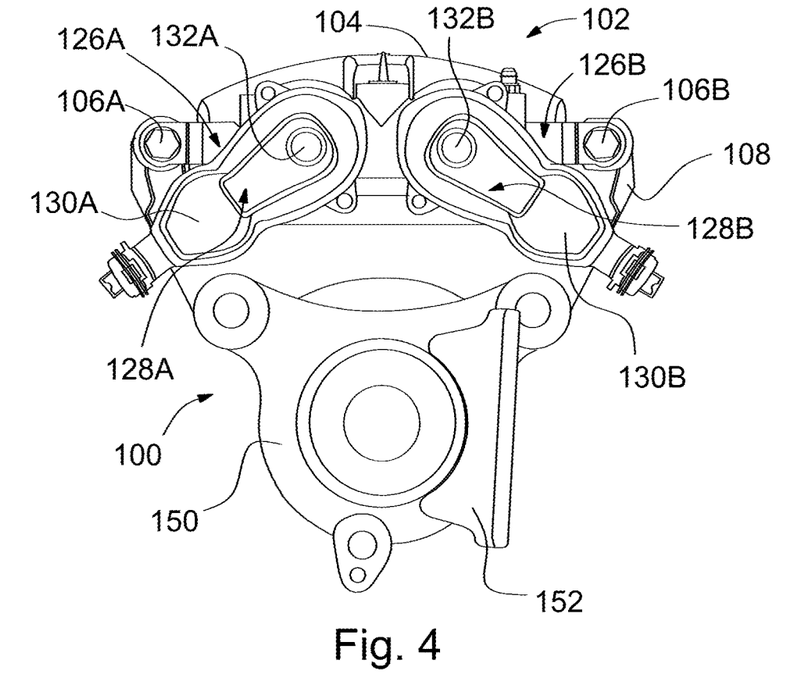
FIG. 4 is a perspective view of the disc brake assembly using the first embodiment of the electric parking brake.
Figure 5:
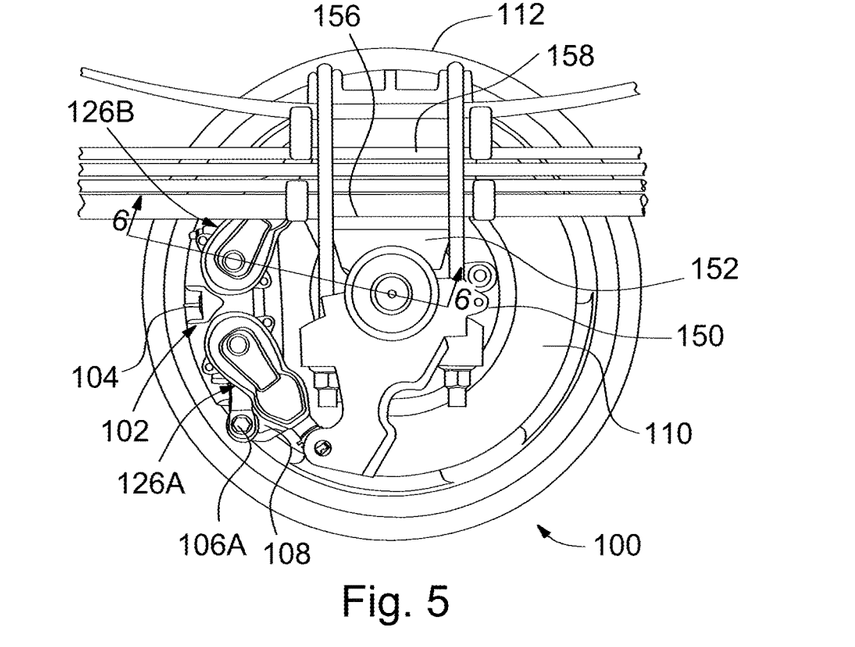
FIG. 5 is a perspective view of an installed disc brake assembly using the first embodiment of the electric parking brake.
Figure 6:
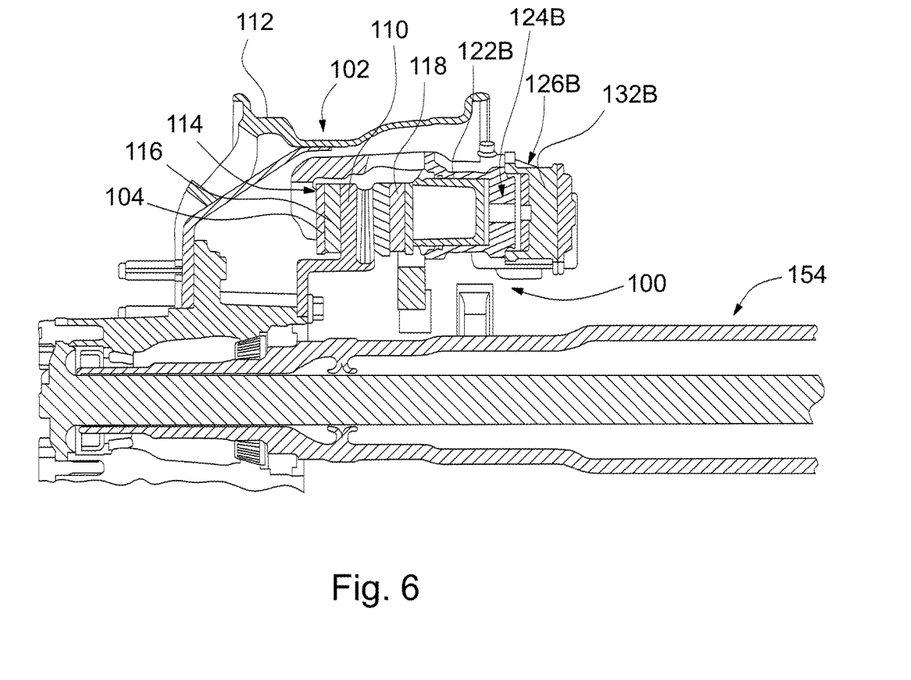
FIG. 6 is a partial sectional view taken along line 6-6 of FIG. 5.

The disc brake assembly 102 includes a brake caliper 104 to which are mounted first and second pins 106A and 106B, respectively. The brake caliper 104 is mounted, and slidably supported on, an anchor bracket 108 by the first and second pins 106A and 106B, respectively, in a manner known to those skilled in the art. The brake caliper 104 spans a brake disc 110 that is coupled to a vehicle wheel 112 in a rotationally fixed manner. Mounted in the brake caliper 104 is a brake lining assembly, indicated generally at 114, which has an outboard brake lining 116 that bears on the brake caliper 104, and an inboard brake lining 118 that bears on first and second actuating pistons 120A and 120B, respectively. The outboard and inboard brake linings 116 and 118, respectively, face towards each other and, in a release position shown in FIG. 1, are disposed with a small air clearance on both sides of the brake disc 110, such that no significant residual drag moments occur. The first piston 120A is mounted in a movable manner in a preferably cylindrical first bore 122A, and the second piston 120B is mounted in a moveable manner in a preferably cylindrical second bore 122B. Both the first and second bores 122A and 122B, respectively, are in the brake caliper 104.

In addition, it can be seen that the first and second pistons 120A and 120B, respectively, are realized so as to be hollow. Accommodated in the first piston 120A is a first rotationally restrained spindle nut, indicated generally at 124A, of a first electromechanical actuator, indicated generally at 126A. Accommodated in the second piston 120B is a second rotationally restrained spindle nut, indicated generally at 124B, of a second electromechanical actuator, indicated generally at 126B. As illustrated, the first actuator 126A is generally parallel to the first piston 120A and the second actuator 126B is generally parallel to the second piston 120B. Alternatively, the first and second actuators 126A and 126B, respectively, may be other than parallel to the first and second pistons 120A and 120B. For example, the first and second actuators 126A and 126B, respectively, may be at right angles to the first and second pistons 120A and 120B, respectively.

The first actuator 126A preferably includes a first drive assembly, indicated generally at 128A, having a suitable first electric motor 130A and first transmission assembly 132A, both of which are known to those skilled in the art. The first transmission assembly 132A transmits torque from the first motor 130A to the first spindle nut 124A. The second actuator 126B preferably includes a second drive assembly, indicated generally at 128B, having a suitable second electric motor 130B and second transmission assembly 132B, both of which are also known to those skilled in the art. The second transmission assembly 132B transmits torque from the second motor 130B to the second spindle nut 124B. Torque is not transmitted between the first and second transmission assemblies 132A and 132B, respectively. Electrical current is supplied to the first motor 130A to actuate or operate the first actuator 126A and separately supplied to the second motor 130B to actuate or operate the second actuator 126B. The electrical current may be stepped or dithered such that there is a sequentially timed current flow for each of the first and second motors 130A and 130B, respectively.

A first output shaft 134A of the first drive assembly 128A, through the transmission assembly 132A, drives a first drive spindle 136A. The first drive spindle 136A is accommodated in a threaded manner in a first threaded receiver 140A of the first spindle nut 124A. A second output shaft 134B of the second drive assembly 128B, through the transmission assembly 132B, drives a second drive spindle 136B. The second drive spindle 136B is accommodated in a threaded manner in a second threaded receiver 140B of the second spindle nut 124B.

The first spindle nut 124A has a first conical portion 142A, which can be brought into bearing contact with a complementary first conical inner surface 144A of the first piston 120A. In the release position, there is a first clearance between the first conical portion 142A and first conical inner surface 144A. The second spindle nut 124B has a second conical portion 142B, which can be brought into bearing contact with a complementary second conical inner surface 144B of the second piston 120B. In the release position, there is a second clearance between the second conical portion 142B and second conical inner surface 144B. The construction, shape, configuration, and/or make-up of the first and second conical portions 142A and 142B, respectively, as well as the complementary first and second inner surfaces 144A and 144B, respectively, may be other than illustrated and described, if so desired. For example, the first and second conical portions 142A and 142B, respectively, and first and second inner surfaces 144A and 144B, respectively, may have other, non-conical complimentary shapes.

When service braking is desired for a vehicle having the disc brake assembly 102, the disc brake assembly 102 is hydraulically actuated. For example, the disc brake assembly 102 may be hydraulically actuated by a driver via a brake pedal or via a drive assistance system. For example, the drive assistance system may be an antilock brake system (ABS), stability control system, or traction control system. When the disc brake assembly 102 is hydraulically actuated, hydraulic fluid is pressurized (by a suitable means known to those skilled in the art) in the first and second bores 122A and 122B, respectively, such that the first and second pistons 120A and 120B, respectively, are displaced towards the brake lining assembly 114. As a consequence, and as is known to those skilled in the art, the inboard brake lining 118 is pressed onto the brake disc 110 by means of the brake caliper 104 and, at the same time, a corresponding displacement of the brake caliper 104 on an opposite side of the brake disc 110 causes the outboard brake lining 116 to be drawn against the opposite side of the brake disc 110.

As a result of the application of the pressurized hydraulic fluid to the first and second bores 122A and 122B, respectively, the first and second pistons 120A and 120B, respectively, are displaced towards the brake disc 110 and into an active braking position. The first and second spindle nuts 124A and 124B, respectively, remain un-actuated.

For activating the parking brake 100, in a manner similar to service braking, the first and second pistons 120A and 120B, respectively, are first put into the active braking position through application of hydraulic pressure. Operation of the first and second actuators 126A and 126B, respectively, then causes the first and second spindle nuts 124A and 124B, respectively, to be displaced towards the brake disc 110, until the first and second clearances have been used up and the first and second conical portions 142A and 142B, respectively, bear on the corresponding first and second conical inner surfaces 144A and 144B, respectively, inside the first and second pistons 120A and 120B, respectively. As a result, the first and second pistons 120A and 120B, respectively, are axially supported, via the first and second spindle nuts 124A and 124B, respectively, on the housing of the brake caliper 104 in a parking brake state.

The first and second actuators 126A and 126B, respectively, are controlled and activated independently and/or individually. The first and second actuators 126A and 126B, respectively, may be activated independently such that the first and second spindle nuts 124A and 124B, respectively, support the first and second pistons 120A and 120B, respectively, together. Operation of the first and second actuators 126A and 126B, respectively, may be coordinated while the first and second actuators 126A and 126B, respectively, are independently activated.

Once the first and second pistons 120A and 120B, respectively, are axially supported, the hydraulic pressure in the first and second bores 122A and 122B, respectively, can be removed. The parking brake state—i.e., clamp up—is maintained because of the position of the first and second spindle nuts 124A and 124B, respectively, and because of self-arresting of the first and second transmission assemblies 132A and 132B, respectively. The outboard and inboard brake linings 116 and 118, respectively, pressing against the brake disc 110 are supported via the first and second spindle nuts 124A and 124B, respectively.

When the parking brake state is to be released, pressurized hydraulic fluid is again introduced into the first and second bores 122A and 122B, respectively. As a result, the first and second pistons 120A and 120B, respectively, are displaced slightly towards the brake disc 110 such that the first and second spindle nuts 124A and 124B, respectively, are relieved of axial load. Through control of the first and second actuators 126A and 126B, respectively, the first and second spindle nuts 124A and 124B, respectively, can be displaced back and release the brake disc 110. The first and second actuators 126A and 126B, respectively, are controlled and released independently and/or individually.

The disc brake assembly 102 is mounted to a mounting flange assembly having a first component 150 and a second component 152. The first mounting flange component 150 secures the disc brake assembly 102 to an axle, indicated generally at 154. The second mounting flange component 152 contacts a suspension surface 156 of vehicle suspension 158 to prevent rotation of the disc brake assembly 102.

The first and second actuators 126A and 126B, respectively, are arranged generally circumferentially about the axle 154. Alternatively, the first and second actuators 126A and 126B, respectively, may be arranged other than as illustrated and/or as packaging requirements for the vehicle require.

Figure 7:
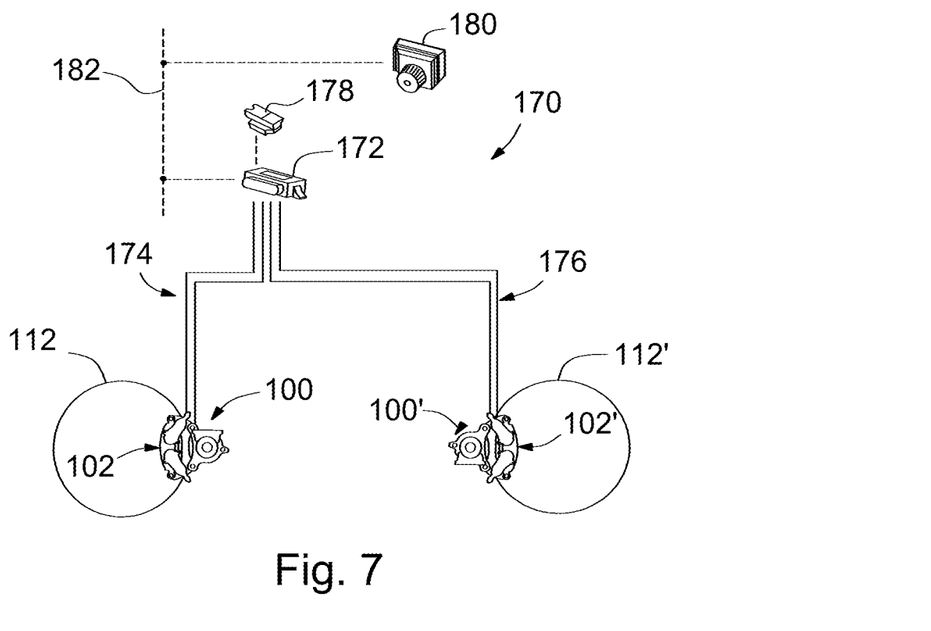
FIG. 7 is a schematic view of a parking brake system using the first embodiment of the electric parking brake.

Referring now to FIG. 7, there is schematically illustrated a parking brake system, indicated generally at 170. The parking brake system 170 includes the electric parking brake 100 and disc brake assembly 102 at the vehicle wheel 112 and an additional electric parking brake 100' and disc brake assembly 102' at an additional vehicle wheel 112'. The additional electric parking brake 100', disc brake assembly 102', and vehicle wheel 112' are substantially similar in structure and operation to the electric parking brake 100, disc brake assembly 102, and vehicle wheel 112.

The parking brake 100, disc brake assembly 102, and vehicle wheel 112 are mounted on a first side of the vehicle and the additional parking brake 100', disc brake assembly 102', and vehicle wheel 112' are mounted on a second side of the vehicle, the second side being opposite the first side. Alternatively, the additional parking brake 100', disc brake assembly 102', and vehicle wheel 112' may be located other than as illustrated. The additional parking brake 100', disc brake assembly 102', and vehicle wheel 112' may differ from the electric parking brake 100, disc brake assembly 102, and vehicle wheel 112 to accommodate installation on the second side of the vehicle. Each of the parking brakes 100 and 100' has first and second actuators 126A and 126B, respectively. Accordingly, as illustrated, the parking brake system 170 has a total of four actuators. Alternatively, as one skilled in the art will understand, the parking brake system 170 may include additional parking brakes than the parking brakes 100 and 100'.

The parking brakes 100 and 100' are connected to an electronic control unit (ECU) 172 by first and second control wiring, indicated generally at 174 and 176, respectively. The first and second control wiring 174 and 176, respectively, each comprise two separate actuator power circuits, one for each of the first and second actuators 126A and 126B, respectively, of the parking brakes 100 and 100'. The four actuators of the parking brake system 170 have four separate actuator power circuits. When a parking brake control switch 178 is operated, the ECU 172 activates or releases (as previously discussed) the parking brakes 100 and 100'. The ECU 172 independently and/or individually activates or releases—i.e., controls—the first and second actuators 126A and 126B, respectively, of the parking brakes 100 and 100'. The ECU 172 is connected to an anti-lock brake system pump and controller assembly 180 by a controller area network (CAN) bus 182.

Figure 8:
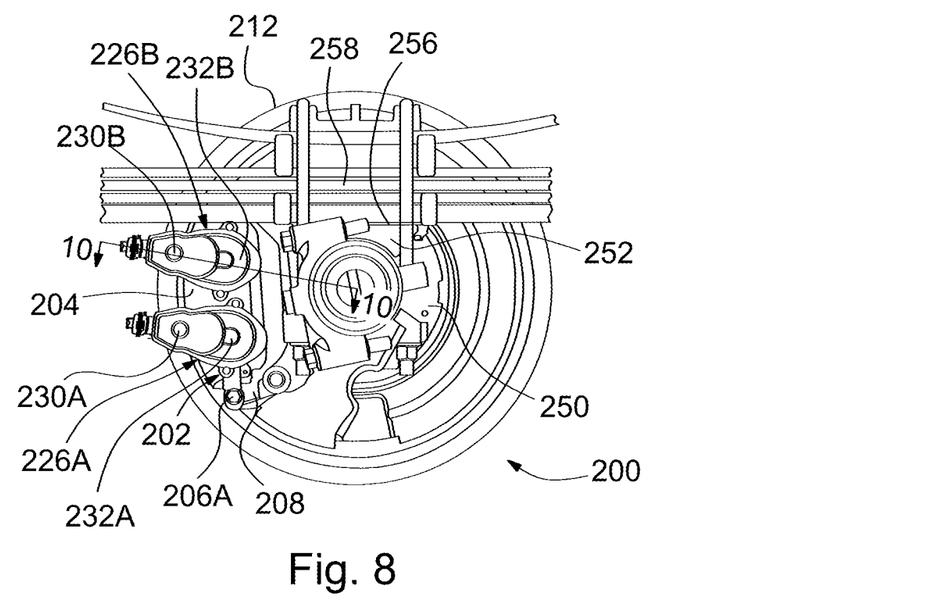
FIG. 8 is an end perspective view of a disc brake assembly using a second embodiment of an electric parking brake in accordance with the present invention.
Figure 9:
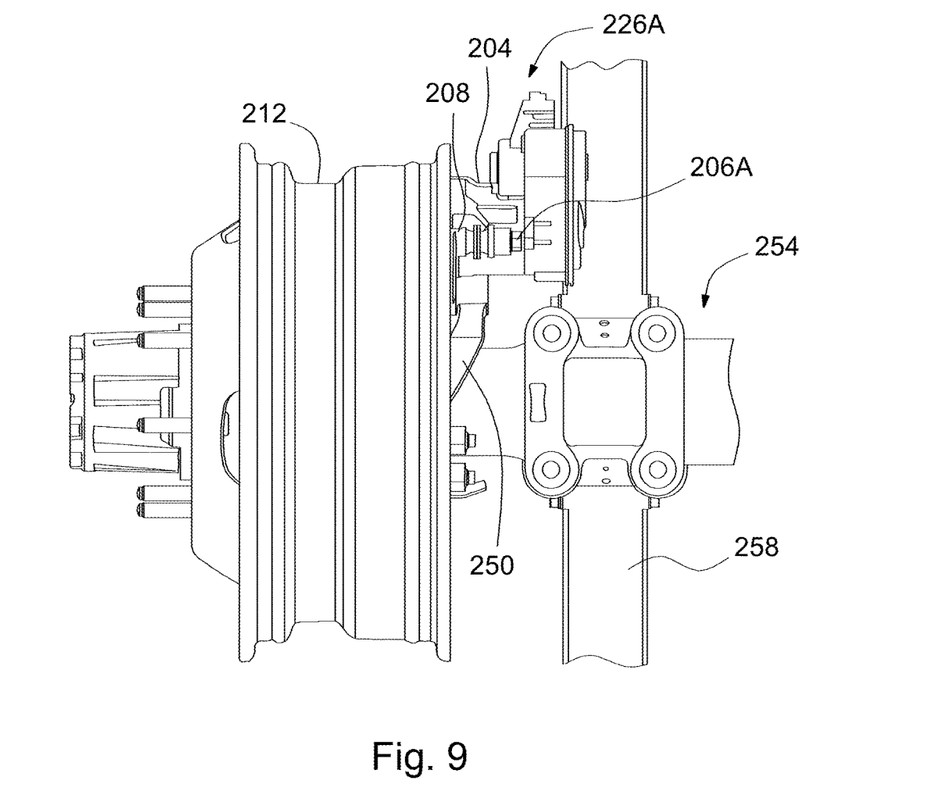
FIG. 9 is a side perspective view of the disc brake assembly using the second embodiment of the electric parking brake.
Figure 10:
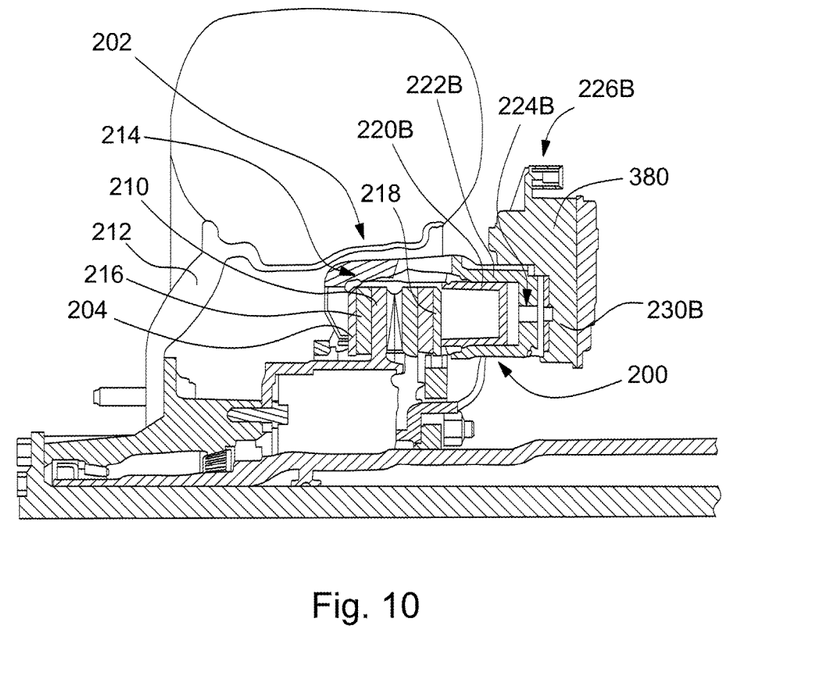
FIG. 10 is a partial sectional view taken along line 10-10 of FIG. 9.

Referring now to FIGS. 8-10, there is illustrated a second embodiment of an electric parking brake, indicated generally at 200, produced in accordance with the present invention and for use with a disc brake assembly, indicated generally at 202. The electric parking brake 200 is a variation of the electric parking brake 100 and, as such, like reference numerals, increased by 100, designate corresponding parts in the drawings and detailed description thereof will be omitted.

First and second electromechanical actuators 226A and 226B, respectively, are arranged parallel to each other and generally parallel to vehicle suspension 258.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A disc brake assembly comprising:
   a hydraulically actuated service brake and a hydraulically and electrically actuated parking brake;
   a brake caliper having first and second bores;
   a first piston mounted in the first bore;
   a first actuator supporting the first piston and configured to be electrically actuated to produce a clamping force to press a brake lining against a brake disc;
   a second piston mounted in the second bore;
   a second actuator supporting the second piston and configured to be electrically actuated to produce a clamping force to press the brake lining against the brake rotor, wherein the first and second actuators are controlled individually and each actuator produces the same clamping force independent of non-uniform pad wear; and
   wherein the first and second pistons are configured to be hydraulically actuated by supplying pressurized hydraulic fluid to the first and second bores to thereby displace the first and second pistons against the brake lining assembly.

2. The disc brake assembly of claim 1 wherein stepped electrical current actuates the first and second actuators.

3. The disc brake assembly of claim 1 further comprising:
   a first motor;
   a first spindle nut supporting the first piston;
   a first transmission assembly transmitting torque from the first motor to the first spindle nut;
   a second motor;
   a second spindle nut supporting the second piston; and
   a second transmission assembly transmitting torque from the second motor to the second spindle nut, wherein torque is not transmitted between the first and second transmission assemblies.

4. The disc brake assembly of claim 1 further comprising:
   a brake disc; and
   inboard and outboard brake linings, wherein the inboard and outboard brake linings are held against the brake disc when the first actuator supports the first piston and the second actuator supports the second piston.

5. The disc brake assembly of claim 1 further comprising:
   first and second pins mounted to the caliper;
   an anchor bracket slidably supporting the first and second pins; and
   inboard and outboard brake linings, wherein the first and second pistons support the inboard and outboard brake linings.

6. The disc brake assembly of claim 1 further comprising:
   an electronic control unit individually controlling the first and second actuators.

7. The disc brake assembly of claim 1 wherein the first and second actuators are electromechanical actuators.

8. The disc brake assembly of claim 1 wherein the first and second actuators are controlled simultaneously.

9. A disc brake assembly comprising:
   a hydraulically actuated service brake and a hydraulically and electrically actuated parking brake;
   a caliper having first and second bores;
   a brake lining assembly mounted to the caliper;
   a first piston mounted in the first bore;
   a second piston mounted in the second bore, wherein the first and second pistons support the brake lining assembly;
   a first electromechanical actuator having:
      a first drive assembly operatively connected to a first spindle; and
      a first spindle nut operatively coupled to the first spindle, wherein rotation of the first spindle by the first drive assembly axially moves the first spindle nut to support the first piston and produce a clamping force to press the brake lining assembly against a brake disc; and
   a second electromechanical actuator; having:
      a second drive assembly operatively connected to a second spindle; and
      a second spindle nut operatively coupled to the second spindle, wherein rotation of the second spindle by the second drive assembly axially moves the second spindle nut to support the second piston and produce a clamping force to press the brake lining assembly against the brake disc;
   wherein the first and second electromechanical actuators are controlled individually and each actuator produces the same clamping force independent of non-uniform pad wear; and
   wherein the first and second pistons are configured to be hydraulically actuated by supplying pressurized hydraulic fluid to the first and second bores to thereby displace the first and second pistons against the brake lining assembly.

10. The disc brake assembly of claim 9 wherein stepped electrical current individually actuates the first and second actuators.

11. The disc brake assembly of claim 9 further comprising:
    a brake disc, wherein the brake lining assembly is held against the brake disc when the first and second pistons support the brake lining assembly.

12. The disc brake assembly of claim 9 further comprising:
    first and second pins mounted to the caliper; and
    an anchor bracket slidably supporting the first and second pins.

13. The disc brake assembly of claim 9 further comprising:
    an electronic control unit individually controlling the first and second actuators.

14. The electric-parking disc brake assembly of claim 9 wherein the first and second actuators are controlled simultaneously.

15. A method of operating a parking brake of a disc brake assembly having a hydraulically actuated service brake and a hydraulically and electrically actuated parking brake comprising:
    pressurizing hydraulic fluid in first and second bores of a brake caliper until a first piston mounted in the first bore and a second piston mounted in the second bore displace towards a brake lining assembly;
    electrically actuating a first spindle nut to support the first piston against the brake lining assembly; and electrically actuating a second spindle nut to support the second piston against the brake lining assembly, wherein the first and second spindle nuts are actuated individually and the actuating of the first and second spindle nuts produces the same clamping force of the first and second pistons against the brake lining assembly independent of non-uniform pad wear.

16. The method of claim 15 further comprising:
individually actuating the first and second spindle nuts using stepped electrical current.

17. The method of claim 15 wherein the first spindle nut is actuated by a first actuator, the second spindle nut is actuated by a second actuator, and the first and second actuators are controlled individually.

18. The method of claim 17 wherein the first and second actuators are actuated simultaneously.

19. The method of claim 15 further comprising:
actuating the first and second spindle nuts using an electronic control unit.

20. The method of claim 15 wherein the pressurizing of the hydraulic fluid in first and second bores of the brake caliper displaces the first and second pistons into engagement with the brake lining assembly.

* * * * *

UNITED STATES PATENT AND TRADEMARK OFFICE
CERTIFICATE OF CORRECTION

PATENT NO. : 10,525,958 B2
APPLICATION NO. : 15/520113
DATED : January 7, 2020
INVENTOR(S) : Manuel Barbosa et al.

Page 1 of 1

It is certified that error appears in the above-identified patent and that said Letters Patent is hereby corrected as shown below:

In the Claims

Column 8, Claim 14, Line 55, Please correct from:
"The electric parking disc brake assembly of claim 9"
To:
--The disc brake assembly of claim 9--

Signed and Sealed this
Twenty-fourth Day of March, 2020

Andrei Iancu
*Director of the United States Patent and Trademark Office*